(12) United States Patent
Lee et al.

(10) Patent No.: US 9,612,736 B2
(45) Date of Patent: Apr. 4, 2017

(54) USER INTERFACE METHOD AND APPARATUS USING SUCCESSIVE TOUCHES

(71) Applicant: Korea Advanced Institute of Science and Technology, Daejeon (KR)

(72) Inventors: Geehyuk Lee, Daejeon (KR); Seongkook Heo, Busan (KR); Jaehyun Han, Daejeon (KR); Jiseong Gu, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 383 days.

(21) Appl. No.: 14/109,308

(22) Filed: Dec. 17, 2013

(65) Prior Publication Data

US 2015/0026619 A1    Jan. 22, 2015

(30) Foreign Application Priority Data

Jul. 17, 2013  (KR) .................. 10-2013-0083986
Dec. 17, 2013  (KR) .................. 10-2013-0156912

(51) Int. Cl.
*G06F 3/0488*    (2013.01)
*G06F 3/0486*    (2013.01)
(Continued)

(52) U.S. Cl.
CPC .......... *G06F 3/0486* (2013.01); *G06F 3/0482* (2013.01); *G06F 3/0485* (2013.01); *G06F 3/0488* (2013.01); *G06F 3/04817* (2013.01); *G06F 3/04845* (2013.01); *G06F 3/04883* (2013.01); *H04W 52/0254* (2013.01)

(58) Field of Classification Search
CPC .. G06F 3/0486; G06F 3/0485; G06F 3/04845; G06F 3/04817; G06F 3/0488; G06F 3/0482; G06F 1/169; G06F 3/03547; G06F 3/0487; G06F 3/0416; H04W 52/0254

See application file for complete search history.

(56) References Cited

U.S. PATENT DOCUMENTS 5,943,043 A * 8/1999 Furuhata ................. G06F 3/045
                                                    345/173
8,239,784 B2 * 8/2012 Hotelling ............. G06F 3/0418
                                                    345/173
(Continued)

FOREIGN PATENT DOCUMENTS

JP    2013074432    4/2013
KR    20090037246   4/2009

*Primary Examiner* — Shen Shiau
(74) *Attorney, Agent, or Firm* — Boyle Fredrickson S.C.

(57) ABSTRACT

Disclosed is a method and apparatus for performing an operation, such as enlargement, reduction and rotation of a screen of a terminal having a touch screen, with one hand using successive touches on the screen. A method of controlling the touch screen may include determining whether two points spaced at a predetermined distance threshold or longer on the touch screen are input as a previous tap and a current tap within a predetermined time threshold, analyzing the previous tap and the current tap to switch to a successive tap operation mode, and performing an operation according to a predetermined successive tap command in the successive tap operation mode.

16 Claims, 15 Drawing Sheets

(51) Int. Cl.
*G06F 3/0481* (2013.01)
*G06F 3/0485* (2013.01)
*G06F 3/0484* (2013.01)
*G06F 3/0482* (2013.01)
*H04W 52/02* (2009.01)

(56) References Cited

U.S. PATENT DOCUMENTS

| | | | |
|---|---|---|---|
| 9,465,457 B2* | 10/2016 | Thompson | G06F 3/038 |
| 2002/0158851 A1* | 10/2002 | Mukai | G06F 3/04883 |
| | | | 345/173 |
| 2007/0024646 A1* | 2/2007 | Saarinen | G06F 3/0485 |
| | | | 345/660 |
| 2007/0120833 A1* | 5/2007 | Yamaguchi | G06F 3/0421 |
| | | | 345/173 |
| 2008/0129686 A1* | 6/2008 | Han | G06F 3/0482 |
| | | | 345/156 |
| 2011/0037720 A1* | 2/2011 | Hirukawa | G06F 3/0488 |
| | | | 345/173 |
| 2011/0102464 A1* | 5/2011 | Godavari | G06F 3/0416 |
| | | | 345/650 |
| 2012/0026100 A1* | 2/2012 | Migos | G06F 3/04883 |
| | | | 345/173 |
| 2012/0127206 A1* | 5/2012 | Thompson | G06F 3/038 |
| | | | 345/661 |
| 2012/0151401 A1* | 6/2012 | Hwang | G06F 3/0488 |
| | | | 715/771 |
| 2012/0218203 A1* | 8/2012 | Kanki | G06F 3/0485 |
| | | | 345/173 |
| 2012/0327122 A1* | 12/2012 | Imamura | G06F 3/04815 |
| | | | 345/649 |
| 2013/0222313 A1* | 8/2013 | Nakamura | G06F 3/04883 |
| | | | 345/173 |
| 2013/0285928 A1* | 10/2013 | Thorsander | G06F 3/04842 |
| | | | 345/173 |
| 2014/0022194 A1* | 1/2014 | Ito | G06F 3/0488 |
| | | | 345/173 |
| 2014/0082545 A1* | 3/2014 | Zhai | G06F 3/04886 |
| | | | 715/773 |
| 2014/0267089 A1* | 9/2014 | Smith | G06F 3/04883 |
| | | | 345/173 |
| 2014/0306907 A1* | 10/2014 | Hoshino | G06F 3/0418 |
| | | | 345/173 |
| 2014/0359528 A1* | 12/2014 | Murata | G06F 3/04847 |
| | | | 715/833 |
| 2015/0109218 A1* | 4/2015 | Satou | G06F 3/0488 |
| | | | 345/173 |
| 2015/0195789 A1* | 7/2015 | Yoon | G06F 3/0488 |
| | | | 345/173 |

* cited by examiner

USER INTERFACE METHOD AND APPARATUS USING SUCCESSIVE TOUCHES

CROSS-REFERENCE TO RELATED APPLICATIONS

This application claims the benefit of Korean Patent Application No. 10-2013-0083986, filed on Jul. 17, 2013, in the Korean Intellectual Property Office, and Korean Patent Application No. 10-2013-0156912, filed on Dec. 17, 2013 in the Korean Intellectual Property Office, the disclosures of which are incorporated herein by reference.

BACKGROUND

Field

The following description relates to a user interface method and apparatus using successive touches that may enable implementation of various operations such as enlargement, reduction, rotation and so on.

Description of the Related Art

Portable devices recently released often include a multi-touch touch screen capable of detecting multipoint touches. Use of multi-touch touch screens enables easy implementation of functions of rotating, enlarging or reducing pictures without manipulation of buttons. People frequently face situations involving multi-touch manipulations with one hand in everyday life. According to conventional technology, a single tap or double tap is possible with one hand. However, it is difficult to conduct various multi-touch manipulations with one hand.

KR Patent Registration No. 10-1173400 discloses a method of measuring touch pressure on a screen using an acceleration value so as to enable additional enlargement/reduction inputs even with one finger as well as conventional touch inputs. KR Patent Publication No. 10-2008-0091502 discloses a method of using gestures with multiple fingers.

In addition, KR Patent Publication No. 10-2010-0121785 discloses a method of performing a multi-touch manipulation by displaying a virtual finger after a predetermined standby time.

SUMMARY

In one general aspect, there is provided a user interface method using a touch, the method including calculating a time difference between a previous tap and a current tap and a distance between the previous tap and the current tap, and determining one operation mode among a plurality of operation modes based on the time difference between the previous tap and the current tap and the distance between the previous tap and the current tap.

The determining of the operation mode based on the time difference between the previous tap and the current tap and the distance between the previous tap and the current tap may include changing the operation mode to a successive tap operation mode when the time difference between the previous tap and the current tap is smaller than a predetermined time threshold and the distance between the previous tap and the current tap is greater than a predetermined distance threshold.

The time threshold may be 500 milliseconds (ms), and the distance threshold may be 9.6 mm.

The method may further include conducting a predetermined process based on a drag input continued from the current tap.

The conducting of the predetermined process based on the drag input continued from the current tap may further include displaying a handle image corresponding to the previous tap and the current tap in the successive tap operation mode, and rotating a displayed image based on the handle image when the current tap is rotated to a rotated location on the previous tap using the drag input.

The conducting of the predetermined process based on the drag input continued from the current tap may further include displaying a handle image corresponding to the previous tap and the current tap in the successive tap operation mode, and enlarging a displayed image when the current tap is relocated using the drag input in an opposite direction to the previous tap. The conducting of the predetermined process based on the drag input continued from the current tap may further include displaying a handle image corresponding to the previous tap and the current tap in the successive tap operation mode, and reducing a displayed image when the current tap is relocated using the drag input in a direction toward the previous tap.

The conducting of the predetermined process based on the drag input continued from the current tap may further include displaying a circular handle image corresponding to the previous tap and the current tap in the successive tap operation mode, and scrolling a displayed image based on a rotation angle of the current tap when the current tap is rotated to a rotated location on the previous tap using the drag input.

The conducting of the predetermined process based on the drag input continued from the current tap may further include displaying a pie-shaped menu corresponding to the previous tap and the current tap in the successive tap operation mode, and selecting an item on the menu based on a rotation angle of the current tab when the current tap is rotated to a rotated location on the previous tap using the drag input.

The determining of the operation mode based on the time difference between the previous tap and the current tap and the distance between the previous tap and the current tap may include changing the operation mode to a double tap operation mode when the time difference between the previous tap and the current tap is smaller than a predetermined time threshold and the distance between the previous tap and the current tap is the same as or smaller than a predetermined distance threshold.

The determining of the operation mode based on the time difference between the previous tap and the current tap and the distance between the previous tap and the current tap may include changing the operation mode to a single tap operation mode when the time difference between the previous tap and the current tap is the same as or greater than a predetermined time threshold.

The method may further include determining whether a previous input is a tap input when a tap input is received, wherein the calculating of the time difference between the previous tap and the current tap and the distance between the previous tap and the current tap may include calculating the time difference between the previous tap and the current tap and the distance between the previous tap and the current tap when the previous input is a tap input.

In another general aspect, there is also provided a user interface method using a touch, the method including receiving a previous tap and a current tap, analyzing the previous tap and the current tap and switching to a successive tap operation mode, and conducting an operation according to a predetermined successive tap command in the successive tap operation mode. The switching to the successive tap operation mode may include verifying whether a time difference between the previous tap and the current tap is within a predetermined time, and verifying whether a distance between the previous tap and the current tap is a predetermined distance or longer. Further, the method may switch to the successive tap operation mode when the time difference is within the predetermined time and the distance is the predetermined distance or longer.

The conducting of the operation in the successive tap operation mode may include displaying a handle image connecting touched points of the previous tap and the current tap and conducting an operation according to the predetermined successive tap command corresponding to a variation at least one of length and angle of the handle image.

The predetermined successive tap command may include at least one of enlargement, reduction, rotation, scrolling, selection of a character string, and execution of a pie-shaped menu.

In another general aspect, there is also provided a user interface apparatus using a touch, the apparatus including an input unit to receive inputs of a previous tap and a current tap, an analyzing unit to calculate a time difference between the previous tap and the current tap and a distance between the previous tap and the current tap, and an execution unit to perform an operation in an operation mode determined based on the time difference between the previous tap and the current tap and the distance between the previous tap and the current tap.

The analyzing unit may include a tap verification module to verify whether a previous input is a tap input, a time difference determining unit to determine whether the time difference between the previous tap and the current tap is within a predetermined time, and a distance determining unit to determine whether the distance between the previous tap and the current tap is a predetermined distance or longer when the time difference between the previous tap and the current tap is within the predetermined time.

The execution unit may change the operation mode to a double tap operation mode when the time difference between the previous tap and the current tap is smaller than a predetermined time threshold and the distance between the previous tap and the current tap is the same as or smaller than a predetermined distance threshold.

The execution unit may change the operation mode to a successive tap operation mode when the time difference between the taps is within the predetermined time and the distance between the taps is the predetermined distance of longer.

The input unit may include at least one of a touch screen, a projection input device, a projection keypad and a hologram user interface device.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
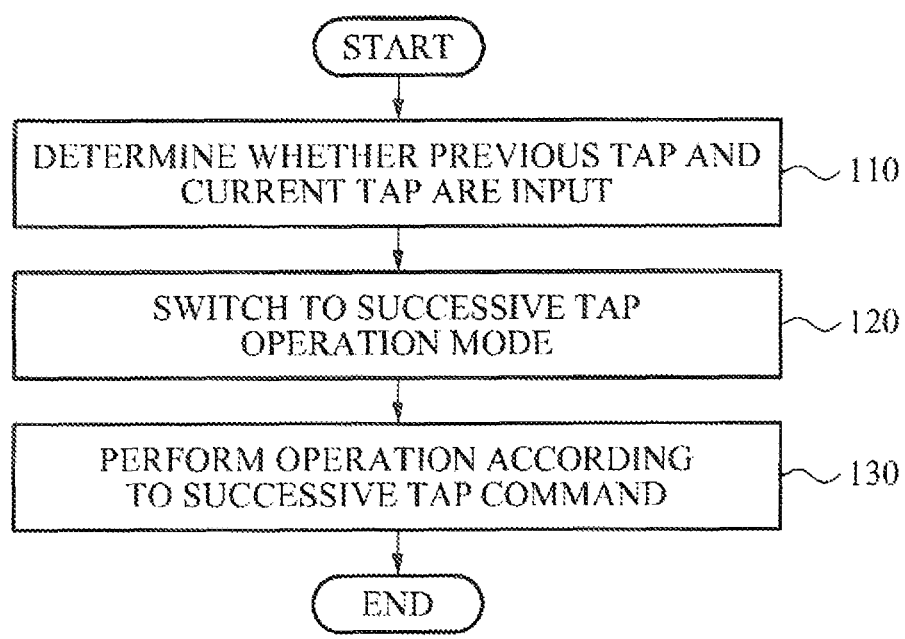
FIG. 1 is a flowchart illustrating a user interface method using a touch according to an exemplary embodiment.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Inputs and/or gestures such as a tap, a double tap, a drag and a multi-touch gesture are generally used in a touch device (for example, touch screen). A tap is a gesture of touching a touch device one time. A double tap is a gesture of touching substantially the same locations twice within a short time, for example, 500 milliseconds (ms) in general. A drag is a gesture of moving a touch while holding the touch on a touch device (for example, touch screen). A multi-touch gesture is a gesture of simultaneously touching a plurality of locations on a touch device (for example, touch screen).

A double tap of touching substantially the same locations within a short time is used, whereas an input of touching a plurality of locations, for example, two different locations, within a predetermined period of time is unavailable yet. Hereinafter, inputting two or more taps spaced away longer than a predetermined distance within a predetermined time period is referred to as a successive tap. For example, the successive tap may include a gesture of inputting a first tap on a random location of a touch screen and then inputting a second tap on a different location within a short period of time.

Although the following exemplary embodiments will be illustrated with a touch screen, the present invention is not limited to the touch screen but may be applicable to any user interface using a touch. For instance, the present invention may be applied to a projection keypad.

FIG. 1 is a flowchart illustrating a user interface method using a touch according to an exemplary embodiment. Referring to FIG. 1, the user interface method using the touch may include determining whether a previous tap and a current tap are input in operation 110, switching to a successive tap operation mode in operation 120, and conducting an operation based on a successive tap command in operation 130.

In operation 110, it may be determined whether the previous tap and the current tap are input with respect to a touch input.

In operation 120, the previous tap and the current tap are analyzed to switch to the successive tap operation mode. The successive tap operation mode is a mode of processing a successive tap, in which a process based on a successive tap, a gesture of touching separate locations at a predetermined distance or longer within a predetermined time difference, is carried out. The successive tap is distinguished from a single tap operation mode and a double tap operation mode. The single tap operation mode is a mode of performing a process based on a tap input that is a one-time touching gesture. The double tap operation mode is a mode of performing a process based on a double tap as a gesture of touching substantially the same locations twice within a short period of time, for example, 500 ms.

Here, it may be verified whether a time difference between the previous tap and the current tap is within a predetermined time and whether a distance between the previous tap and the current tap is a predetermined distance or longer. When the time difference between the previous tap and the current tap is within the predetermined time and the distance between the previous tap and the current tap is the predetermined distance or longer, the method may switch to the successive tap operation mode.

In operation 130, an operation may be carried out according to a predetermined successive tap command in the successive tap operation mode. For example, a handle image connecting touched points of the previous tap and the current tap may be displayed to perform the operation according to the successive tap command. The operation may be performed according to the successive tap command corresponding to a length and variation in angle of the handle image. For instance, enlargement, reduction, rotation, scrolling, selection of a character string, and execution of a pie-shaped menu may be carried out based on the length and variation in angle of the handle image. User interface operations using a successive tap and successive tap commands will be illustrated in detail with FIGS. 5 to 10.

Figure 2:
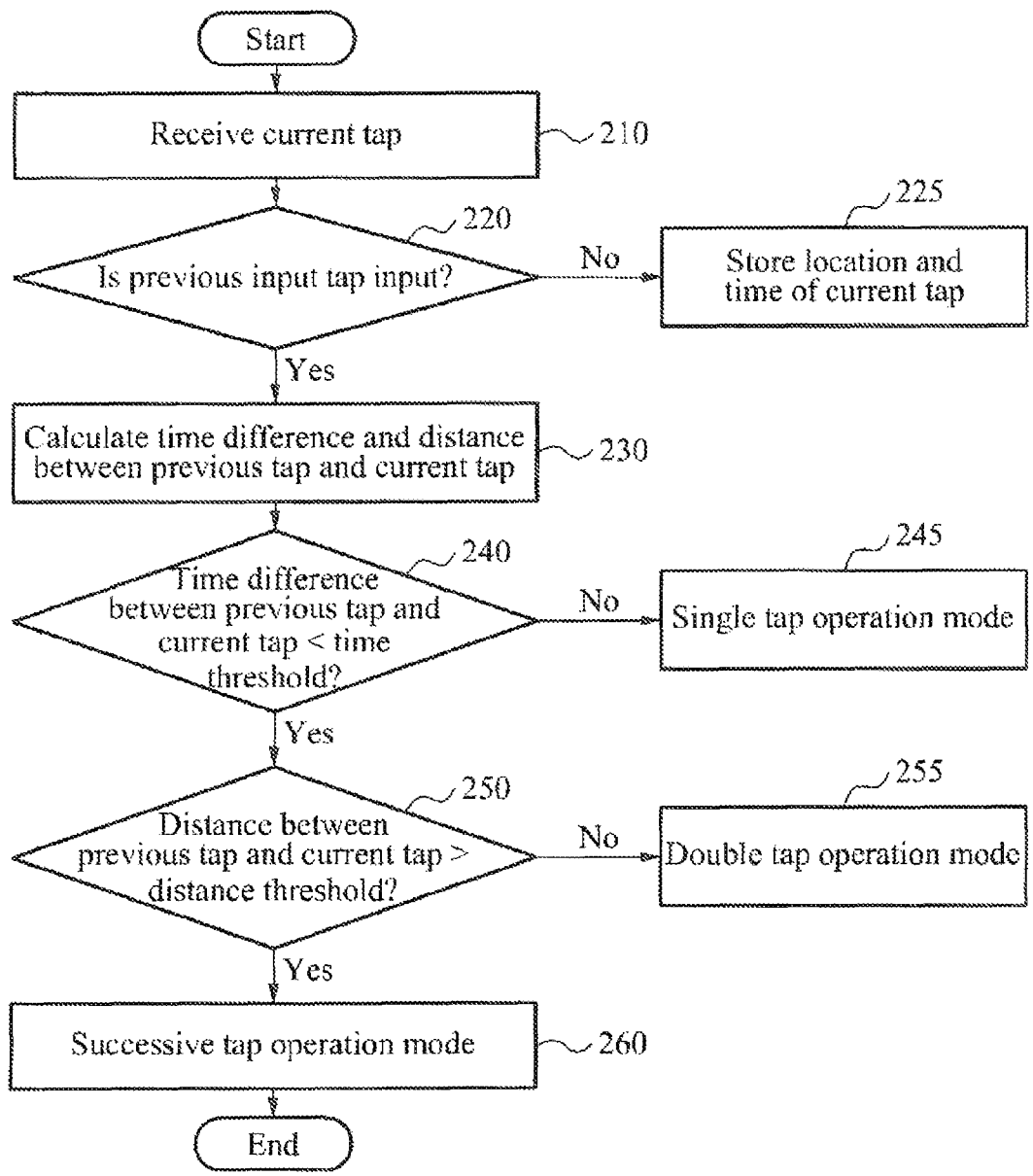
FIG. 2 is a flowchart illustrating a user interface method using a touch according to an exemplary embodiment.

FIG. 2 is a flowchart illustrating a user interface method using a touch according to an exemplary embodiment.

In operation 210, a touch user interface device may receive a current tap. The touch user interface device is a user interface device using touches. The touch user interface device may include a touch screen, a projection input device, a projection keypad, a hologram user interface device, and so on. For example, when the touch user interface device is a touch screen, a tap input or touch input on the touch screen is received. When the touch user interface device is a projection keypad, a tap input made by a user on a projected keypad is received. When the touch user interface device is a hologram user interface, a tap input made by a user on a hologram is received.

When the tap input is received, the touch user interface device may determine whether a previous input is a tap input in operation 220.

When the previous input is a tap input in operation 220, the touch user interface device may calculate a time difference between the previous tap and the current tap in operation 230. Further, the touch user interface device may calculate a distance between the previous tap and the current tap. An operation mode may be determined based on the time difference between the previous tap and the current tap and the distance between the previous tap and the current tap. Specifically, one of a plurality of operation modes, for instance, a single tap operation mode, a double tap operation mode and/or a successive tap operation mode, may be selected based on the time difference between the previous tap and the current tap and the distance between the previous tap and the current tap.

When the previous input is not a tap input in operation 220, the touch user interface device may store a location and/or time of the current tap in operation 225, which is for calculating a time difference and distance between the current tap and a next tap when the next tap is input following the current tap.

In operation 240, the touch user interface device may compare the time difference between the previous tap and the current tap with a predetermined time threshold. For example, the predetermined time threshold may be 500 ms.

When the time difference between the previous tap and the current tap is the same as or greater than the predetermined time threshold in operation 240, the touch user interface device may change the operation mode to a single tap operation mode in operation 245. The single tap operation mode is a mode of performing a process based on a tap input as a one-time touching gesture. The single tap operation mode may perform the same process as a conventional single tap process. For example, in the single tap operation mode, selecting an application or image may be carried out through a single tap.

When the time difference between the previous tap and the current tap is smaller than the predetermined time threshold in operation 240, the touch user interface device may compare the distance between the previous tap and the current tap with a predetermined distance threshold in operation 250. For example, the predetermined distance threshold may be 9.6 mm. According to another embodiment, the predetermined distance threshold may be 50 pixels.

When the distance between the previous tap and the current tap is the same as or smaller than the predetermined distance threshold in operation 250, the touch user interface device may change the operation mode to a double tap operation mode in operation 255. That is, when the time difference between the previous tap and the current tap is smaller than the predetermined time threshold and the distance between the previous tap and the current tap is the same as or smaller than the predetermined distance threshold, the touch user interface device may change the operation mode to the double tap operation mode in operation 255. The double tap operation mode is a mode of performing a process based on a double tap as a gesture of touching substantially the same locations twice within a short period of time, for example, 500 ms. The double tap operation mode may perform the same process as a conventional double tap process. For example, in the double tab operation mode, enlarging an image may be carried out through a double tap on the image.

When the distance between the previous tap and the current tap is greater than the predetermined distance threshold in operation 250, the touch user interface device may change the operation mode to a successive tap operation mode in operation 260. The successive tap operation mode is a mode of performing a process based on a successive tap as a gesture of touching separate locations at a predetermined distance, for example, 9.6 mm or 50 pixels, within a predetermined time difference, for example 500 ms. The successive tap operation mode enables a variety of new user interfaces.

For instance, a line connecting the previous tap and the current tap may be displayed and used. A first tap is input, a second tap at a distance threshold is input within a time threshold, and a handle image connecting the first tap and the second tap is displayed. The current tap is dragged to a rotated location based on the previous tap, thereby presenting a displayed image rotated based on the handle image. Accordingly, the user may conveniently rotate the displayed image. Further, when the current tap is relocated in an opposite direction to the previous tap, the displayed image may be enlarged. In addition, when the current tap is relocated in a direction toward the previous tap, the displayed image may be reduced. Such processes of manipulating the handle image will be described in detail with reference to FIGS. 5 to 7B.

Alternatively, a circular handle image may be displayed corresponding to the previous tap and the current tap. Here, when the current tap is relocated to a rotated location based on the previous tap, the image displayed on the touch screen may be scrolled based on a rotation angle, which will be described in detail with reference to FIG. 8.

Also, a character string may be selected corresponding to the previous tap and the current tap. The character string beginning from the previous tap to the current tap may be selected. Subsequently, the selected character string may be subjected to an operation, such as cutting, copying and changing a font style, which will be described in detail with reference to FIG. 9.

In addition, a pie-shaped menu may be displayed corresponding to the previous tap and the current tap. When the current tap is relocated to a rotated location based on the previous tap, an item on the menu may be selected based on a rotation angle, which will be described in detail with reference to FIG. 10.

Figure 3:
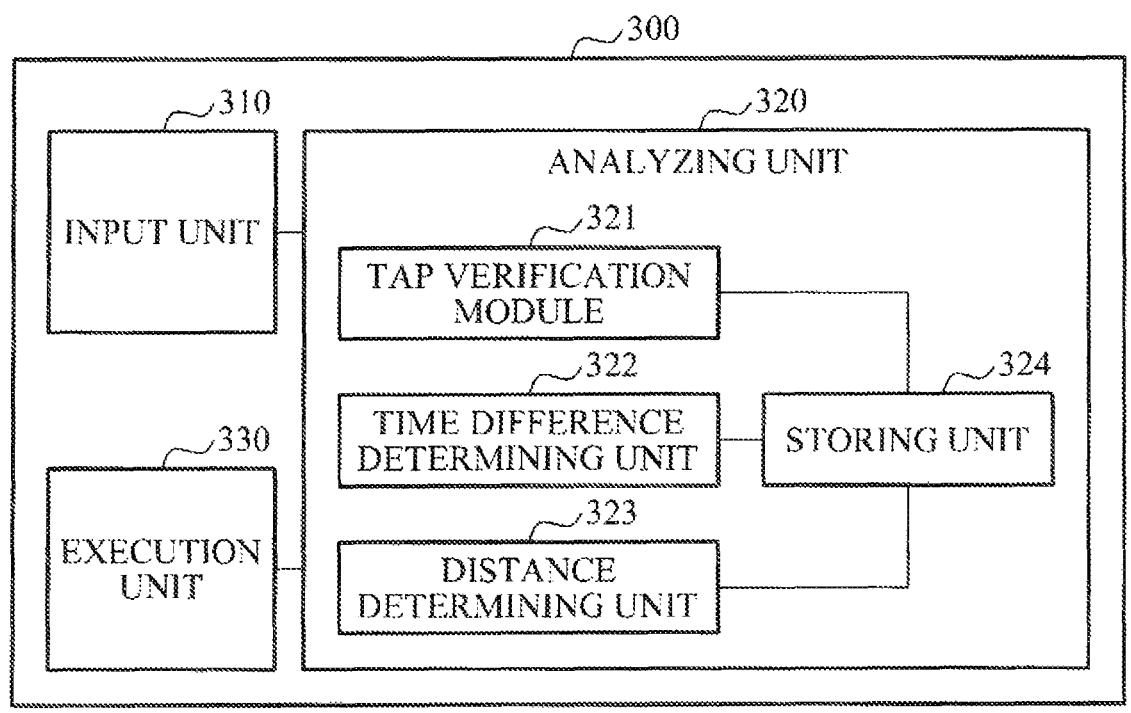
FIG. 3 is a block diagram illustrating a user interface apparatus using a touch according to an exemplary embodiment.

FIG. 3 is a block diagram illustrating a touch user interface apparatus 300 according to an exemplary embodiment.

The touch user interface apparatus 300 may include an input unit 310, an analyzing unit 320 and an execution unit 330.

The input unit 310 receives inputs of a previous tap and a current tap. The input unit 310 may receive a touch input. The input unit 310 may includes a touch screen, projection input device, a projection keypad, a hologram input device, etc. For example, the input unit 310 may be a touch screen. In this case, the input unit 310 receives a tap input on the touch screen. Alternatively, the input unit 310 may be a projection input device. In this case, the input unit 310 may receive a tap input on a projected image. Alternatively, the input unit 310 may be a projection keypad. In this case, the input unit 310 may receive a tap input on a projected keypad. Alternatively, the input unit 310 may be a hologram input device. In this case, the input unit 310 may receive a tap input on a hologram.

The analyzing unit 320 may calculate a time difference between the previous tap and the current tap and a distance between the previous tap and the current tap. The analyzing unit 320 may determine an operation mode based on a result of calculating the time difference between the previous tap and the current tap and the distance between the previous tap and the current tap. Specifically, one of a plurality of operation modes, for instance, a single tap operation mode, a double tap operation mode and/or a successive tap operation mode, may be selected based on the time difference between the previous tap and the current tap and the distance between the previous tap and the current tap. The operation mode may be determined based on whether the two input taps are by single tap input, double tap input or successive tap input.

The analyzing unit 320 may include a tap verification module 321, a time difference determining unit 322, a distance determining unit 323 and a storing unit 324.

The tap verification module 321 may verify whether a current input is a tap input. When the current input is a tap input, the tap verification module 321 may verify whether a previous input is a tap input. For example, any type of user inputs may be stored in a queue, and the tap verification unit 321 may check the queue to verify whether the previous input is tap input.

The storing unit 324 may store locations and times of input taps. In one exemplary embodiment, the storing unit 324 may store locations and times of a plurality of recently input taps, for example, ten taps. Alternatively, when the previous input is not a tap input, the storing unit 324 may store a location and time of the current tap.

The time difference determining unit 322 may determine whether the time difference between the previous tap and the current tap is within a predetermined time. The time difference determining unit 322 may compare an input time of the current tap with an input time of the previous tap stored in the storing unit 324, thereby determining whether the time difference between the previous tap and the current tap is within the predetermined time.

The distance determining unit 323 may determine whether the distance between the previous tap and the current tap is a predetermined distance or longer. The distance determining unit 323 may compare the location of the current tap with a location of the previous tap stored in the storing unit 324, thereby comparing whether the distance between the previous tap and the current tap is the predetermined distance or longer.

The analyzing unit 320 may also include a processing unit (not shown). The processing unit may determine the operation mode based on a determination result by the time difference determining unit 322 and the distance determining unit 323.

The execution unit 330 performs an operation in the operation mode determined based on the time difference between the previous tap and the current tap and the distance between the previous tap and the current tap. The execution unit 330 may perform the successive tap operation mode when the time difference between the previous tap and the current tap is smaller than a predetermined time threshold and the distance between the previous tap and the current tap is greater than a predetermined distance threshold. In the successive tap operation mode, the execution unit 330 may display a handle image connecting touched points of the previous tap and the current tap. The execution unit 330 may perform the operation according to a predetermined successive tap command corresponding to a length and variation in angle of the handle image. For instance, the handle image may be presented as a line connecting the points of the previous tap and the current tap. The execution unit 330 may move an image displayed on the touch screen based on the handle image, thereby conducting rotation, enlargement or reduction of the image.

The execution unit 330 may perform the single tap operation mode when the time difference between the previous tap and the current tap is the same as or greater than the predetermined time threshold. For instance, in the single tap operation mode, the execution unit 330 may conduct selection of an application or an image in response to a single tap input.

The execution unit 330 may perform the double tap operation mode when the time difference between the previous tap and the current tap is smaller than the predetermined time threshold and the distance between the previous tap and the current tap is the same as or smaller than the predetermined distance threshold. For instance, in the double tap operation mode, the execution unit 330 may conduct enlargement of an image in response to a double tap input.

Figure 4A:
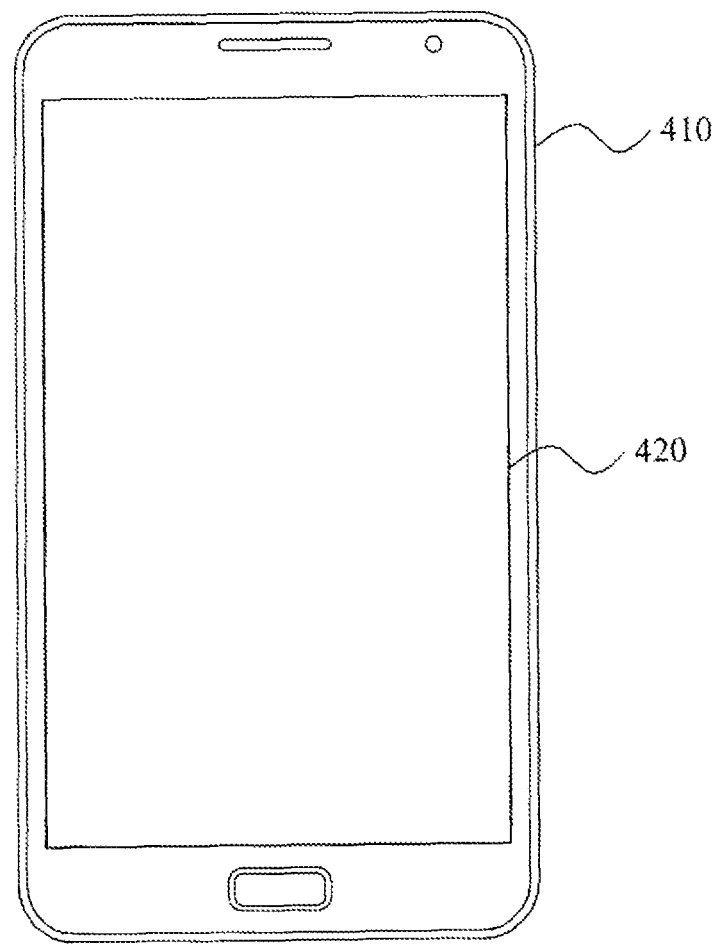
FIGS. 4A and 4B illustrate a user interface apparatus using a touch according to an exemplary embodiment.
Figure 4B:
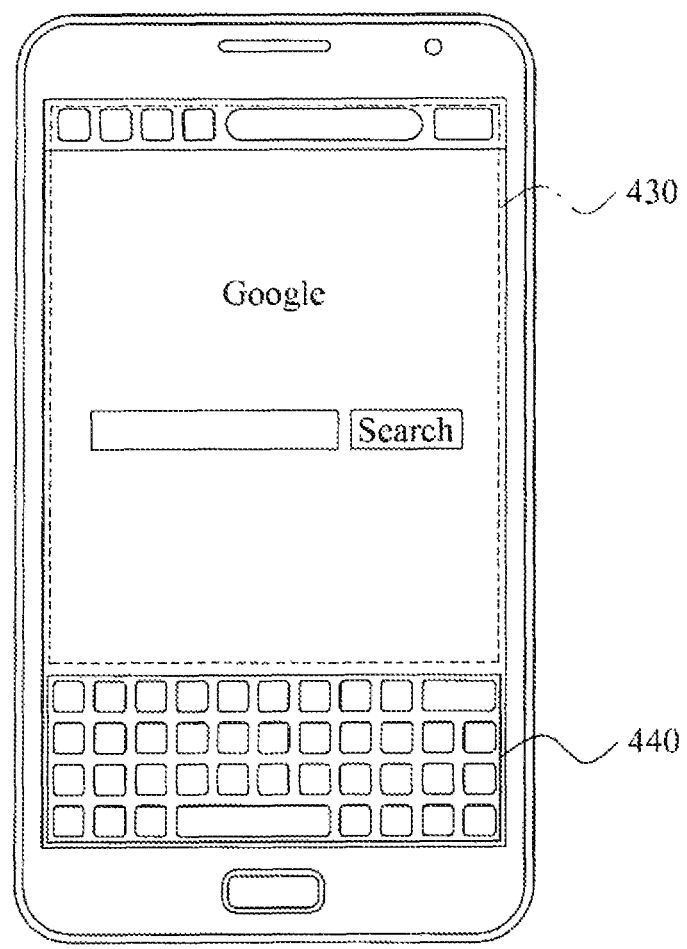

FIGS. 4A and 4B illustrate a user interface apparatus 410 using a touch according to an exemplary embodiment.

Referring to FIG. 4A, the touch user interface apparatus 410 is a mobile phone including a touch screen as an input unit 420. Exemplary embodiments illustrated herein may be implemented on the mobile phone with the touch screen but are not limited thereto. The touch screen may also function as a display unit.

FIG. 4B illustrates an application executed on the touch user interface apparatus 410 according to an exemplary embodiment. For example, when character input is needed, an application screen may display a virtual keyboard 440 for entering characters on a bottom of the display unit. When character input is not needed, the application screen may display an information display and operation section 430 on the entire display unit. Conventionally, a successive tap operation may be used to enter characters in a virtual keyboard section 440. However, the successive tap operation is not used in the information display and operation section 430.

In one exemplary embodiment, the touch user interface apparatus 410 may determine whether a successive tap is input in a location of the virtual keyboard section 440. When the successive tap is input in the location of the virtual keyboard section 440, the touch user interface apparatus 410 may process a general keyboard input. However, the location of the input successive tap is not in the virtual keyboard section 440, the touch user interface apparatus 410 may change the operation mode to the successive tap operation mode and perform the successive tap operation mode.

Figure 5:
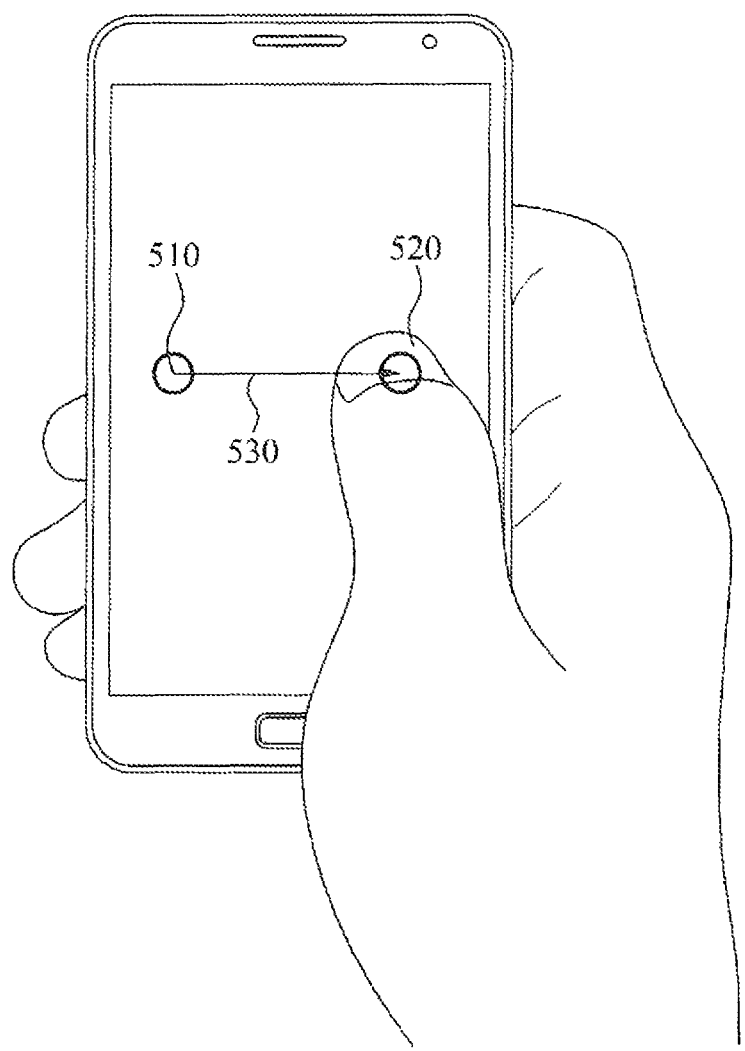
FIG. 5 illustrates execution of a successive tap operation mode according to an exemplary embodiment.

FIG. 5 illustrates execution of the successive tap operation mode according to an exemplary embodiment. An example of conducting an operation on the touch user interface apparatus using a successive tap command with one hand will be described with reference to FIG. 5.

For example, when successive touches are made on two points 510 and 520 on the input unit spaced at a distance threshold, of for example 9.6 mm or 50 pixels, within a time threshold of for example 500 ms, with the touch user interface apparatus held with one hand, the tap inputs on the two points 510 and 520 may be determined as a successive tap input. Thus, the touch user interface apparatus may change the operation mode to the successive tap operation mode and perform the successive tap operation mode. For example, the touch user interface apparatus may display a handle image 530 connecting the two points 510 and 520.

Figure 6A:
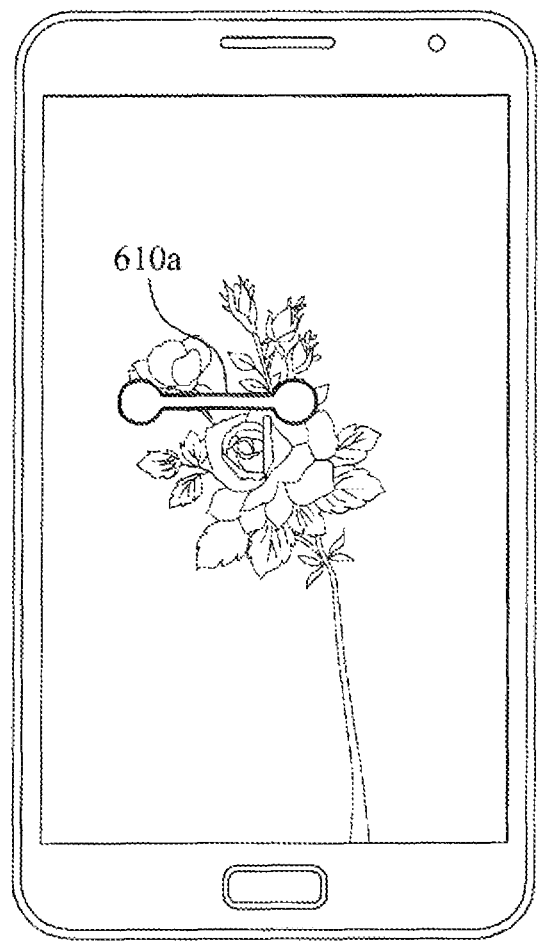
FIGS. 6A to 6C illustrate a method of manipulating a handle in the successive tap operation mode according to an exemplary embodiment.
Figure 6B:
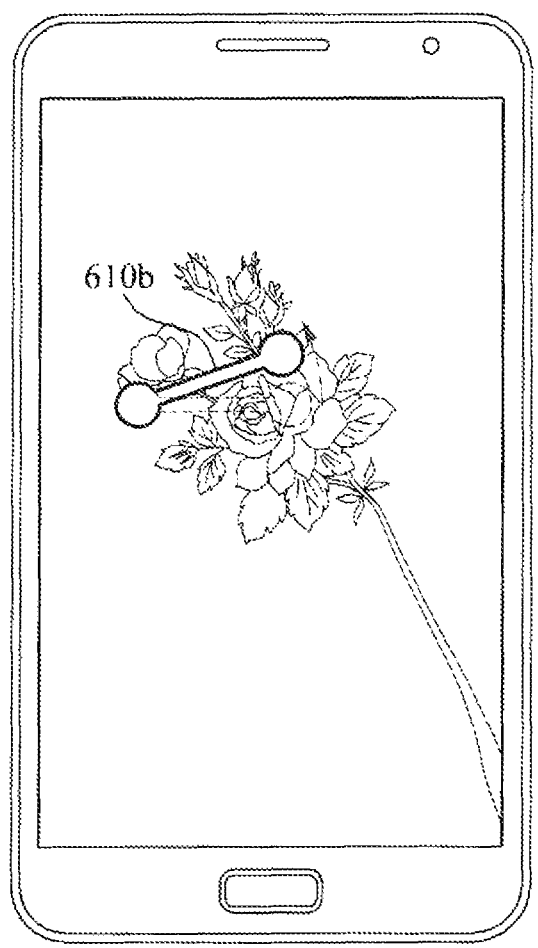
Figure 6C:
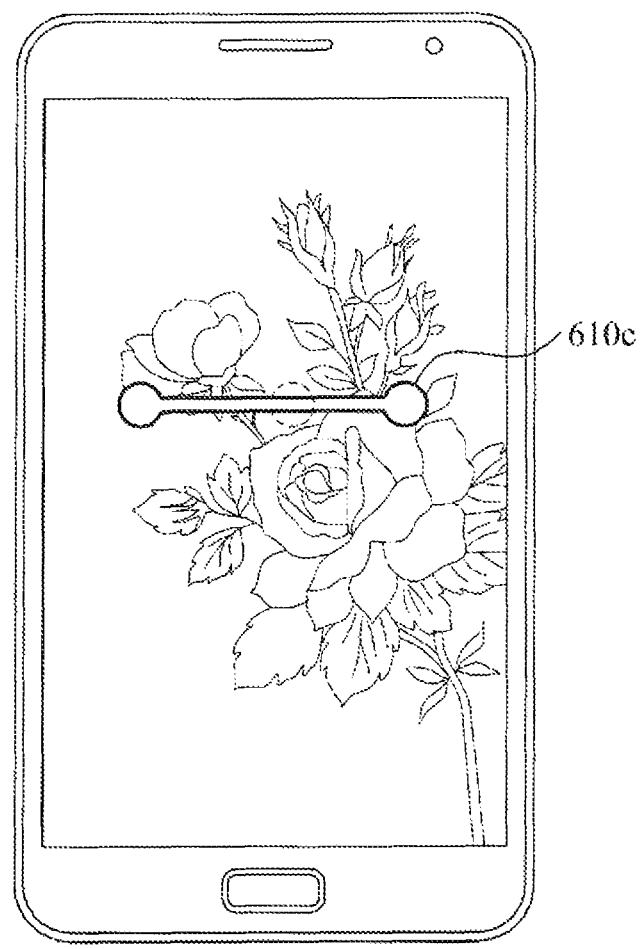

FIGS. 6A to 6C illustrate a method of manipulating a handle image in the successive tap operation mode according to an exemplary embodiment.

Referring to FIG. 6A, when two points on an image displayed on the display unit that are spaced at a distance threshold, of for example 9.6 mm or 50 pixels, are successively touched within a time threshold of for example 500 ms, the touch user interface apparatus may perform the successive tap operation mode. The touch user interface apparatus may display a handle image 610*a* corresponding to the previous tap and the current tap in the successive tap operation mode. For instance, the touch user interface apparatus may display the handle image 610*a* connecting the previous tap and the current tap on the display unit, as shown in FIG. 6A. A user may conduct various operations using the handle image 610*a*. The handle image 610*a* serves to help the user intuitively recognize an operation form.

The touch user interface apparatus may conduct a predetermined process according to a drag input following the current tap. For example, when the current tap is relocated to a rotated location based on the previous tap using the drag input, the image displayed on the touch screen may be rotated based on the handle image 610*a*. Specifically, when a second tap is input following a first tap, the handle image 610*a* is displayed as shown in FIG. 6A. Subsequently, when the second tap is dragged, being in contact with the touch screen, a handle image 610*b* rotated based on the previous tap corresponding to a drag input is displayed and the displayed image is also rotated at the same angle, which are shown in FIG. 6B. Alternatively, the foregoing rotation operation may be carried out in response to the same successive tap input as described above, without displaying the handle image.

Furthermore, when the current tap is relocated using the drag input in an opposite direction to the previous tap in the successive tap operation mode, the image displayed on the touch screen may be enlarged. For example, when a second tap is input following a first tap, the handle image 610*a* is displayed as shown in FIG. 6A. Subsequently, when the second tap is dragged in the opposite direction to the previous tap, being contact with the touch screen, a handle image 610*c* enlarged as much as dragged is displayed. Also, the displayed image may be enlarged proportionately to an enlarged extent of the handle image 610*c*. The enlarged handle image 610*c* and the enlarged image are shown in FIG. 6C. Alternatively, the foregoing enlargement operation may be carried out in response to the same successive tap input as described above, without displaying the handle image.

Also, when the current tap is relocated using the drag input in a direction toward the previous tap in the successive tap operation mode, the displayed image may be reduced. For example, when a second tap is input following a first tap, the handle image 610*a* is displayed as shown in FIG. 6A. Subsequently, when the second tap is dragged in the direction toward the previous tap, being contact with the touch screen, a handle image reduced as much as dragged is displayed. Also, the displayed image may be reduced proportionately to a reduced extent of the handle image. Alternatively, the foregoing reduction operation may be carried out in response to the same successive tap input as described above, without displaying the handle image.

As described above, the current tap forming the handle image is moved by a drag, thereby modifying the image displayed on the display unit using relative angle variation or rotation between the two points and enlargement and reduction ratios.

Figure 7A:
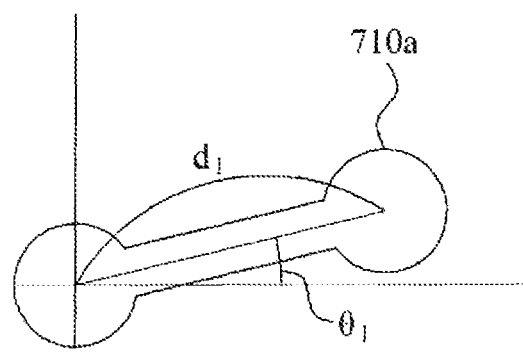
FIGS. 7A and 7B illustrate parameters used for calculating a rotation angle and an enlargement ratio when a handle is operated based on a drag input continued from a current tap according to an exemplary embodiment.
Figure 7B:
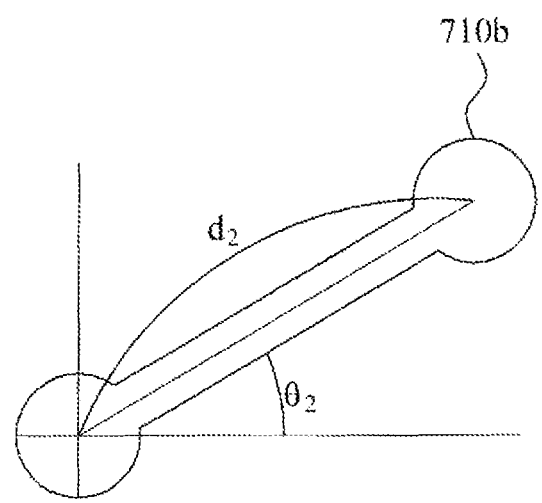

FIGS. 7A and 7B illustrate parameters used for calculating a rotation angle and an enlargement ratio when a handle is operated based on a drag input continued from a current tap according to an exemplary embodiment.

According to one exemplary embodiment of successive tap commands in the successive tap operation mode, when the current tap is moved to a rotated location based on a previous tap, an image displayed on the touch screen may be rotated based on a handle image using a drag input continued from the current tap. When the current tap is moved in an opposite direction to the previous tap, the image displayed on the touch screen may be enlarged. Further, when the current tap is moved in a direction toward the previous tap, the image displayed on the touch screen may be reduced.

FIG. 7A illustrates a handle image 710a before an operation that any one of two points of the handle image is not moved. Here, a length of the handle image may be represented by $d_1$ and an angle of the handle image may be represented by $\theta_1$.

FIG. 7B illustrates a handle image 710b after an operation that one of the two points of the handle image is dragged so that an angle and distance between the two points are changed. Referring to FIGS. 7A and 7B, the handle image 710a before the operation may be at an angle of $\theta_1$, the handle image 710b after the operation may be at an angle of $\theta_2$, the handle image 710a before the operation may have a length of $d_1$, and the handle image 710b after the operation may have a length of $d_2$. Here, a rotation angle $\theta$ of the handle image having an initial rotation angle of $\theta_0$ may be expressed by Equation 1.

$$\theta=\theta_0+(\theta_2-\theta_1) \quad \text{[Equation 1]}$$

Further, when the handle image 710a has a length of $d_1$, and the handle image 710b has a length of $d_2$, an enlargement ratio S of the handle image having an initial enlargement ratio of $S_0$ may be expressed by Equation 2.

$$s=s_0 d_2/d_1 \quad \text{[Equation 2]}$$

Figure 8:
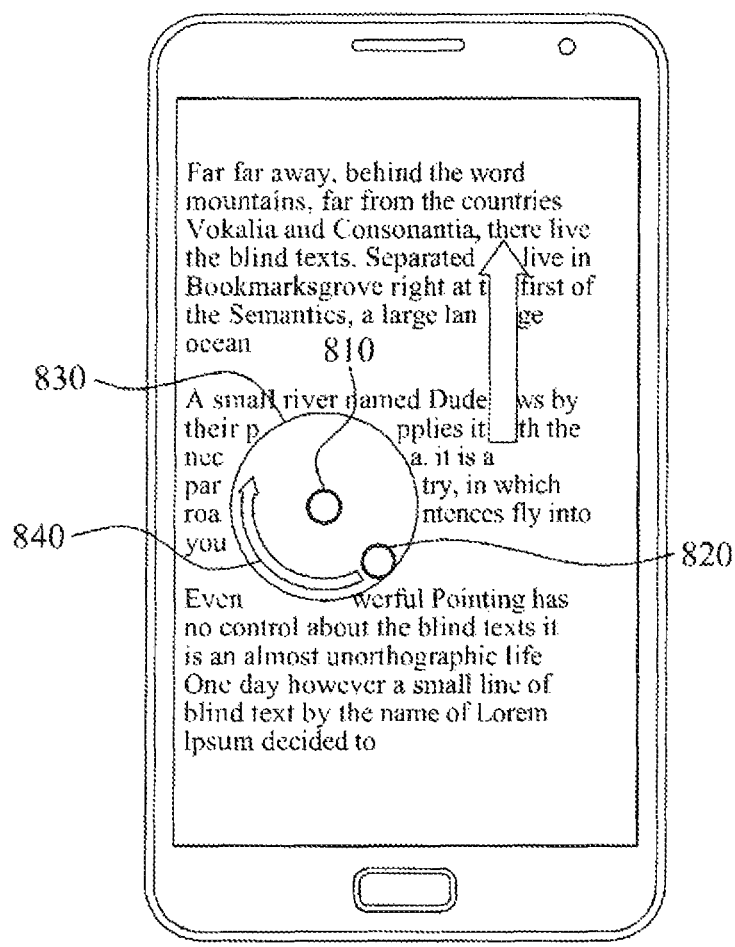
FIG. 8 illustrates a scrolling method based on a drag input continued from a current tap in the successive tap operation mode according to an exemplary embodiment.

FIG. 8 illustrates a scrolling method based on a drag input continued from a current tap in the successive tap operation mode according to an exemplary embodiment. In one exemplary embodiment, the touch user interface apparatus may display a circular handle image 830 corresponding to a previous tap 810 and a current tap 820. Here, when the current tap 820 is relocated to a rotated location 840 based on the previous tap 810 using a drag input, an image displayed on the touch screen may be scrolled based on a rotation angle.

For example, in the successive tap operation mode, the circular handle image 830 may be displayed with a location of the previous tap 810 as a center of a circle and a distance from the previous tap to the current tap 820 as a radius. The current tap 820 may be relocated to the rotated location 840 on the circular handle image 830 using a drag input continued from the current tap, thereby conducting a scrolling operation. Here, when an initial scrolling point is $P_0$ and a scrolling variation based on an angle change is P interval, a scrolling point P based on an angle change may be expressed by Equation 3.

$$p=p_0+(\theta_2-\theta_1)*p_{interval} \quad \text{[Equation 3]}$$

Here, the scrolling variation P interval may be set by the user. As such, scrolling may be carried out using the drag input continued from the current tap.

Figure 9:
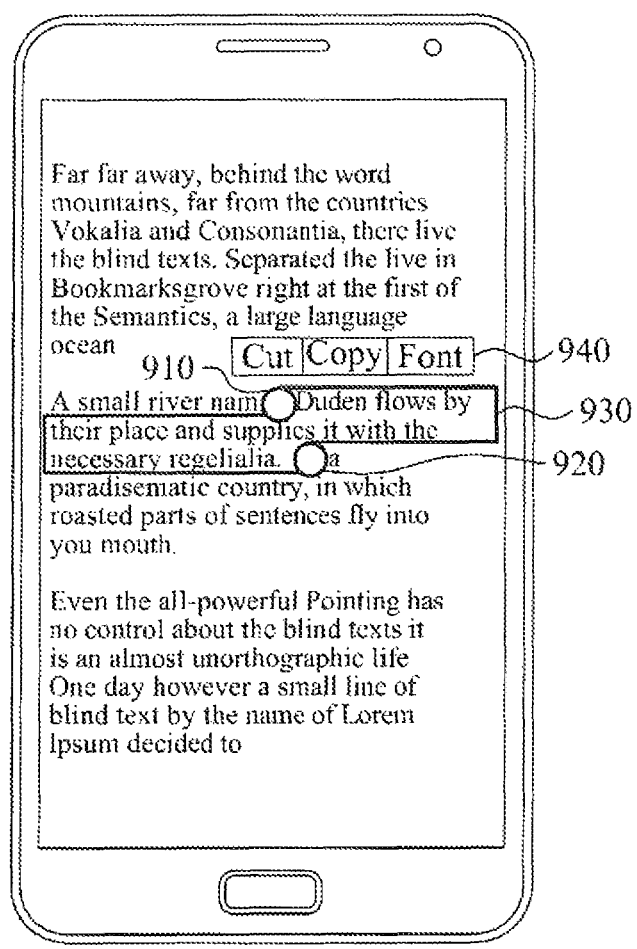
FIG. 9 illustrates a method of selecting and/or manipulating a character string based on a drag input continued from a current tap in the successive tap operation mode according to an exemplary embodiment.

FIG. 9 illustrates a method of selecting and manipulating a character string based on a drag input continued from a current tap in the successive tap operation mode according to an exemplary embodiment.

According to one exemplary embodiment of the successive tap commands in the successive tap operation mode, a character string may be selected as indicated by a box 930 corresponding to a previous tap 910 and a current tap 920. The character string beginning from the previous tap 910 to the current tap 920 may be selected as indicated by the box 930. Subsequently, the selected character string may be subjected to an operation 940, such as cutting, copying and changing a font style. As such, selection and manipulation of the character string may be carried out using the drag input continued from the current tap.

Figure 10:
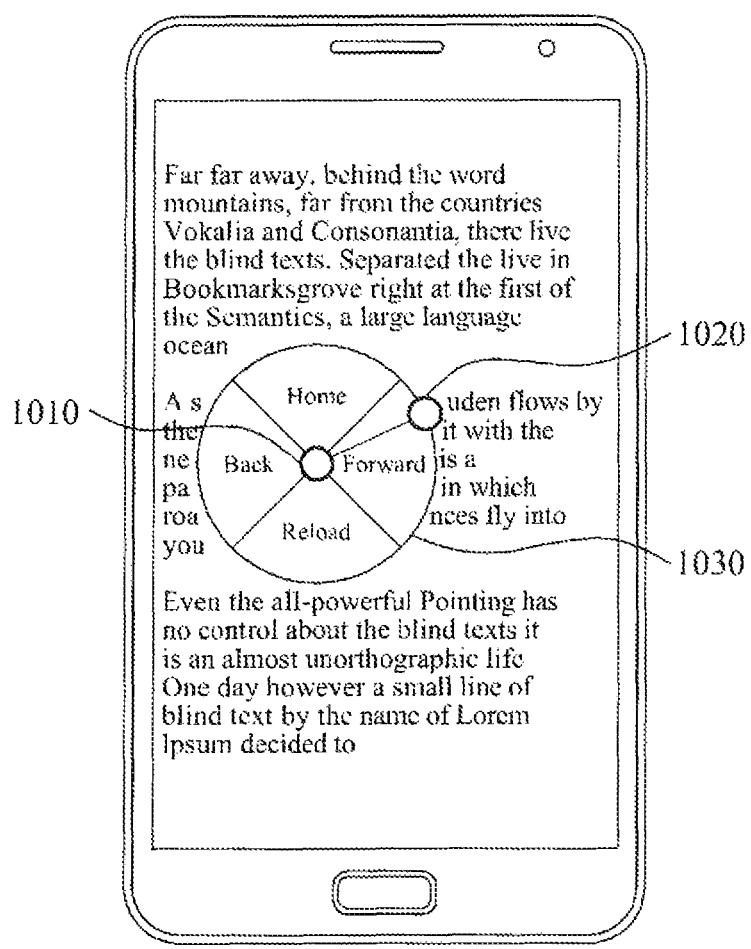
FIG. 10 illustrates a method of invoking and executing a pie-shaped menu based on a drag input continued from a current tap in the successive tap operation mode according to an exemplary embodiment.

FIG. 10 illustrates a method of invoking and executing a pie-shaped menu based on a drag input continued from a current tap in the successive tap operation mode according to an exemplary embodiment.

In the successive tap operation mode, a pie-shaped menu 1030 may be displayed corresponding to a previous tap 1010 and a current tap 1020. When the current tap 1020 is relocated to a rotated location based on the previous tap 1010 using a drag input, an item on the menu may be selected based on a rotation angle. For example, the pie-shaped menu 1030 may include Home, Forward, Back and Reload. The current tap 1020 is moved to one location on the pie-shaped menu 1030 and the touch is released, thereby selecting a menu. Also, the current tap 1020 is dragged to a location of the previous tap 1010 to cancel the pie-shaped menu 1030. As such, invoking and executing the pie-shaped menu may be carried out using the drag input continued from the current tap.

Figure 11:
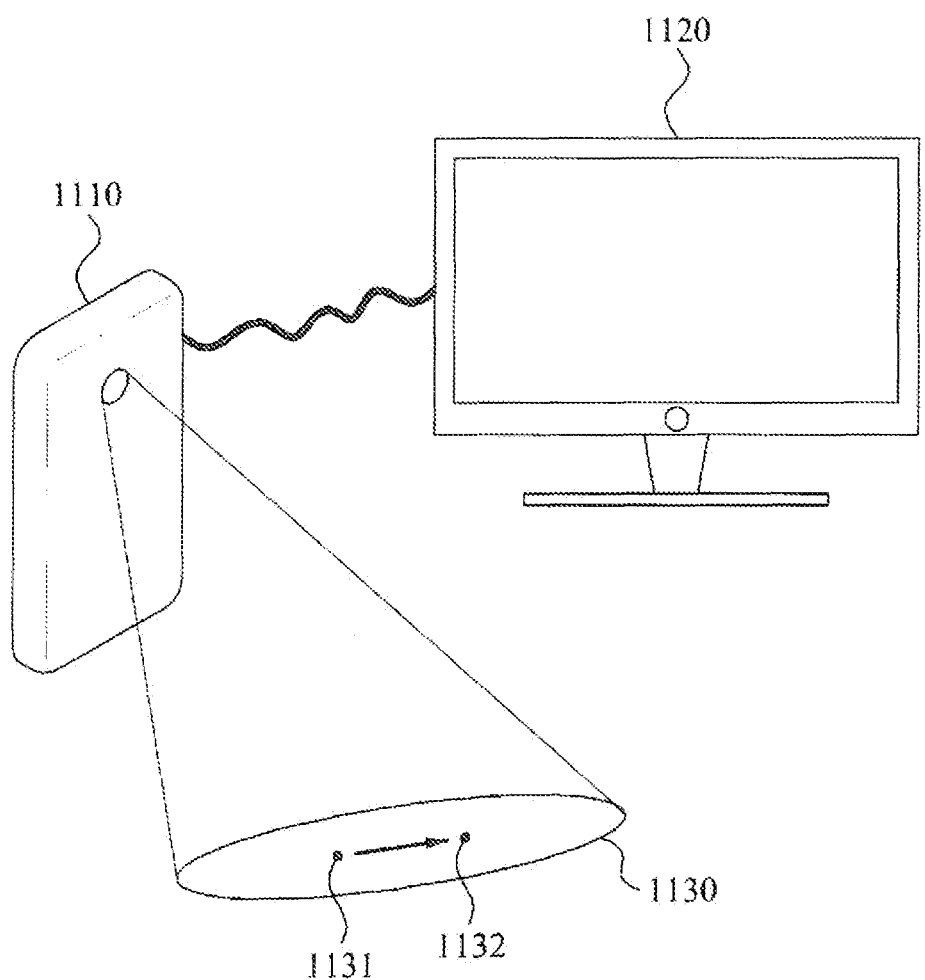
FIG. 11 illustrates a projection input device using a successive tap input according to an exemplary embodiment.

FIG. 11 illustrates a projection input device 1110 using a successive tap input according to an exemplary embodiment.

Although the foregoing embodiments have been illustrated with the device including the touch screen as the touch user interface apparatus, the touch user interface apparatus is not limited thereto. The touch user interface apparatus may include various user interface devices using touches. For instance, the projection input device 1110 shown in FIG. 11 may also use a successive input tap.

In FIG. 11, the projection input device 1110 is connected to a display apparatus 1120. The projection input device 1110 may display the same image as displayed on the display apparatus 1120 as a projected image 1130 using projection. Further, the projection input device 1110 may perceive a motion input by the user with a finger on the projected image 1130 using a camera (not shown). Here, the user may input a successive tap on the projected image 1130. In this case, the same types of interfaces as mentioned in the aforementioned embodiments may be carried out.

For example, the user may input a first tap 1131 on the projected image 1130 and then input a second tap 1132 within a predetermined distance threshold from the first tap 1131 within a predetermined time threshold. Then, the projection input device 1110 determines the inputs as a successive tap and operates in the successive tap operation mode. Accordingly, the same interface operations as described above with reference to FIGS. 5 to 10 may be carried out.

Alternatively, the projection input device 1110 may be a projection keypad. In this instance, the projected image 1130 corresponds to the keypad. A drag on the keypad is a meaningless motion. Thus, when a first tap 1131 is input on the projected keypad, a second tap 1132 within a predetermined distance threshold from the first tap 1131 is input within a predetermined time threshold, and then a drag continued from the second tap 1132 is input, the projection input device 1110 determines the inputs as a successive tap and operates in the successive tap operation mode. Two successive tap inputs without a drag input are merely general keyboard inputs, in which case the projection input device 1110 serves a keyboard input operation.

The foregoing touch user interface apparatus is provided for illustrative purposes only and is not construed as limiting the exemplary embodiments. The touch user interface apparatus include any device that conducts an input using a touch by the user.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The methods according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A user interface method using a touch, the method comprising:
    calculating a time difference between a previous tap and a current tap and a distance between the previous tap and the current tap; and
    determining an operation mode based on the time difference between the previous tap and the current tap and the distance between the previous tap and the current tap, and
    wherein the determining of the operation mode based on the time difference between the previous tap and the current tap and the distance between the previous tap and the current tap comprises:
    changing the operation mode to a successive tap operation mode when the time difference between the previous tap and the current tap is smaller than a predetermined time threshold and the distance between the previous tap and the current tap is greater than a predetermined distance threshold.

2. The method of claim 1, wherein:
    the predetermined time threshold is 500 milliseconds (ms), and the predetermined distance threshold is 9.6 mm.

3. The method of claim 1, further comprising:
    conducting a predetermined process based on a drag input continued from the current tap.

4. The method of claim 3, wherein the conducting of the predetermined process based on the drag input continued from the current tap further comprises:
    displaying a handle image corresponding to the previous tap and the current tap in the successive tap operation mode, and
    rotating a displayed image based on the handle image when the current tap is rotated to a rotated location on the previous tap using the drag input.

5. The method of claim 3, wherein the conducting of the predetermined process based on the drag input continued from the current tap further comprises:
    displaying a handle image corresponding to the previous tap and the current tap in the successive tap operation mode, and
    enlarging a displayed image when the current tap is relocated using the drag input in an opposite direction to the previous tap.

6. The method of claim 3, wherein the conducting of the predetermined process based on the drag input continued from the current tap further comprises:

displaying a handle image corresponding to the previous tap and the current tap in the successive tap operation mode, and reducing a displayed image when the current tap is relocated using the drag input in a direction toward the previous tap.

7. The method of claim 3, wherein the conducting of the predetermined process based on the drag input continued from the current tap further comprises:

displaying a circular handle image corresponding to the previous tap and the current tap in the successive tap operation mode, and scrolling a displayed image based on a rotation angle of the current tap when the current tap is rotated to a rotated location on the previous tap using the drag input.

8. The method of claim 3, wherein the conducting of the predetermined process based on the drag input continued from the current tap further comprises:

displaying a pie-shaped menu corresponding to the previous tap and the current tap in the successive tap operation mode, and selecting an item on the menu based on a rotation angle of the current tap when the current tap is rotated to a rotated location on the previous tap using the drag input.

9. The method of claim 1, wherein the determining of the operation mode based on the time difference between the previous tap and the current tap and the distance between the previous tap and the current tap comprises:

changing the operation mode to a double tap operation mode when the time difference between the previous tap and the current tap is smaller than a predetermined time threshold and the distance between the previous tap and the current tap is equal to or smaller than a predetermined distance threshold.

10. The method of claim 1, wherein the determining of the operation mode based on the time difference between the previous tap and the current tap and the distance between the previous tap and the current tap comprises:

changing the operation mode to a single tap operation mode when the time difference between the previous tap and the current tap is equal to or greater than a predetermined time threshold.

11. The method of claim 1, further comprising:

determining whether a previous input is a tap input when a tap input is received, wherein the calculating of the time difference between the previous tap and the current tap and the distance between the previous tap and the current tap comprises:

calculating the time difference between the previous tap and the current tap and the distance between the previous tap and the current tap when the previous input is a tap input.

12. A user interface method using a touch, the method comprising:

receiving a previous tap and a current tap;

switching to a successive tap operation mode based on the previous tap and the current tap; and conducting an operation according to a predetermined successive tap command in the successive tap operation mode, and wherein the switching to the successive tap operation mode comprises:

verifying whether a time difference between the previous tap and the current tap is within a predetermined time, verifying whether a distance between the previous tap and the current tap is a predetermined distance or longer, and switching to the successive tap operation mode when the time difference is within the predetermined time and the distance is the predetermined distance or longer.

13. The method of claim 12, wherein the conducting of the operation in the successive tap operation mode comprises:

displaying a handle image connecting touched points of the previous tap and the current tap, and conducting an operation according to the predetermined successive tap command corresponding to a variation in at least one of length and angle of the handle image.

14. The method of claim 13, wherein the predetermined successive tap command comprises:

at least one of enlargement, reduction, rotation, scrolling, selection of a character string, and execution of a pie-shaped menu.

15. A user interface apparatus using a touch, the apparatus comprising:

an input unit configured to receive inputs of a previous tap and a current tap; and a processor executing a program stored in a non-transient medium configured to:

verify whether a previous input is a tap input;

calculate a time difference between the previous tap and the current tap and a distance between the previous tap and the current tap;

determine whether the time difference between the previous tap and the current tap is within a predetermined time;

determine whether the distance between the previous tap and the current tap is a predetermined distance or longer when the time difference between the previous tap and the current tap is within the predetermined time;

change an operation mode to a successive tap operation mode when the time difference between the previous tap and the current tap is within the predetermined time and the distance between the previous tap and the current tap is the predetermined distance or longer; and perform an operation in the operation mode determined based on the time difference between the previous tap and the current tap and the distance between the previous tap and the current tap.

16. The apparatus of claim 15, wherein:

the input unit is further configured to include at least one of a touch screen, a projection input device, a projection keypad and a hologram user interface device.

* * * * *